US005762398A

United States Patent [19]
Gonzalez et al.

[11] Patent Number: 5,762,398
[45] Date of Patent: Jun. 9, 1998

[54] ROTATING AUTOMOBILE SEAT

[76] Inventors: Frances D. Gonzalez; Gonzalo Gonzalez, both of P.O. Box 1144, La Joya, Tex. 78560

[21] Appl. No.: 825,755

[22] Filed: Apr. 3, 1997

[51] Int. Cl.⁶ ...................................................... A47C 1/08
[52] U.S. Cl. .................... 297/250.1; 297/256.12; 297/256.16; 297/344.26; 5/81.1 RP
[58] Field of Search ............... 297/250.1, 256.12, 297/256.16, 344.26, 344.21; 5/81.1 RP, 653; 414/921

[56] References Cited

U.S. PATENT DOCUMENTS

| | | | |
|---|---|---|---|
| 4,034,947 | 7/1977 | Grisel | 5/81.1 RP X |
| 5,079,789 | 1/1992 | Jandrakovic | 5/81.1 RP |
| 5,311,622 | 5/1994 | Allen | 5/81.1 RP |
| 5,318,339 | 6/1994 | Cherniak | 297/250.1 X |

*Primary Examiner*—Laurie K. Cranmer

[57] ABSTRACT

A rotating automobile seat including a seat assembly. A rotation assembly is secured between upper and lower seat supports of the seat assembly. A rotation limiter is secured between the upper and lower seat supports of the seat assembly. A plurality of straps extend outwardly from the seat assembly. The straps are adapted for securement to an existing vehicle seat when the seat assembly is positioned on the vehicle seat.

4 Claims, 2 Drawing Sheets

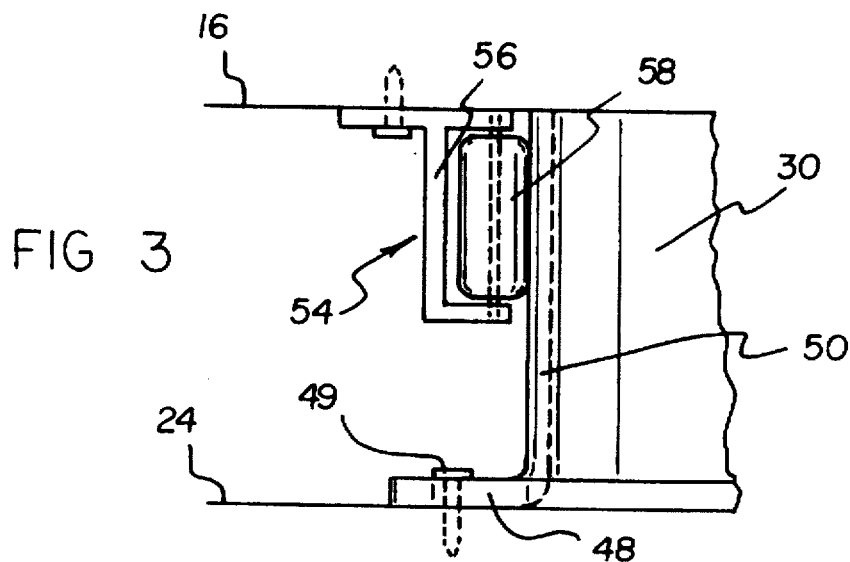
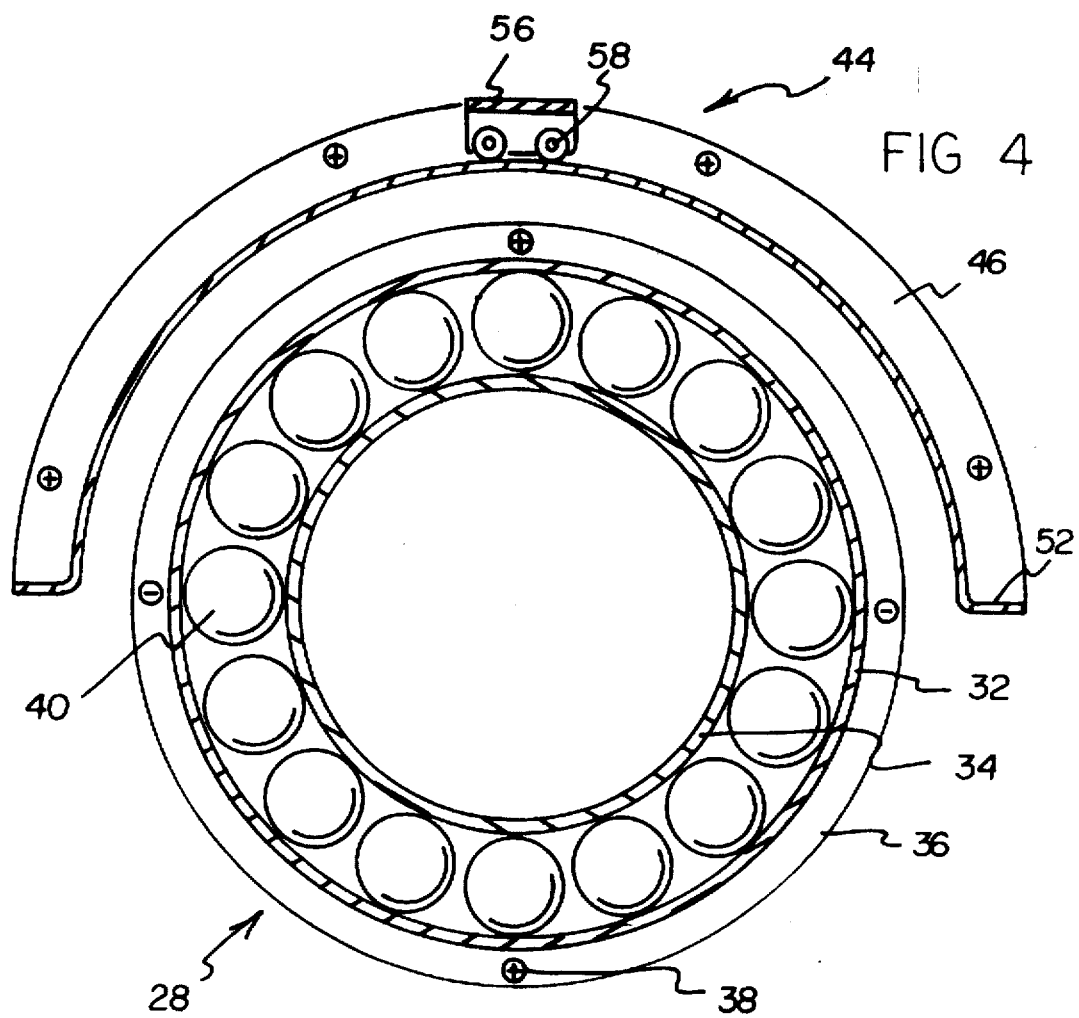

ROTATING AUTOMOBILE SEAT

BACKGROUND OF THE INVENTION

1. Field of the Invention

The present invention relates to a rotating automobile seat and more particularly pertains to allowing a person to easily get into and out of a vehicle with a rotating automobile seat.

2. Description of the Prior Art

The use of the swivel seats is known in the prior art. More specifically, swivel seats heretofore devised and utilized for the purpose of rotating around a pivot are known to consist basically of familiar, expected and obvious structural configuration, notwithstanding the myriad of designs encompassed by the crowded prior art which have been developed for the fulfillment of countless objectives and requirements.

By way of example, U.S. Pat. No. 4,846,529 to Tulled discloses a swivel seat.

U.S. Pat. No. 4,705,256 to Hofrichter discloses a swivel seat pedestal.

U.S. Pat. No. Des. 333,924 to Parfitt et al. discloses the ornamental design for a vehicle seat mounting mechanism.

U.S. Pat. No. 4,436,270 to Muraishi discloses a support mechanism of swivel seat structure.

U.S. Pat. No. 4,792,188 to Kawashima discloses a swivel seat for vehicle.

U.S. Pat. No. 4,600,239 to Gerstein et al. discloses a vehicular seat for handicapped and elderly persons.

While these devices fulfill their respective, particular objective and requirements, the aformentioned patents do not describe a rotating automobile seat for allowing a person to easily get into and out of a vehicle.

In this respect, the rotating automobile seat according to the present invention substantially departs from the conventional concepts and designs of the prior art, and in doing so provides an apparatus primarily developed for the purpose of allowing a person to easily get into and out of a vehicle.

Therefore, it can be appreciated that there exists a continuing need for new and improved rotating automobile seat which can be used for allowing a person to easily get into and out of a vehicle. In this regard, the present invention substantially fulfills this need.

SUMMARY OF THE INVENTION

In the view of the foregoing disadvantages inherent in the known types of swivel seats now present in the prior art, the present invention provides an improved rotating automobile. As such, the general purpose of the present invention, which will be described subsequently in greater detail, is to provide a new and improved rotating automobile seat and method which has all the advantages of the prior art and none of the disadvantages.

To attain this, the present invention essentially comprises a seat assembly comprised of a padded upper seat. The padded upper seat has a rigid upper seat support secured to a lower surface thereof. The seat assembly includes a base member. The base member has a pair of side supports extending downwardly therefrom. A space is disposed between the pair of side supports. The space is dimensioned for receiving an existing automobile seat therein. The base member has a rigid lower seat support secured to an upper surface thereof. A rotation assembly is secured between the upper and lower seat supports of the seat assembly. The rotation assembly includes a circular channel member defined by interior and exterior walls secured to an upper surface of the lower seat support. The circular channel member has a plurality of ball bearings disposed therein. A rotation limiter is secured between the upper and lower seat supports of the seat assembly. The rotation limiter includes a semi-circular bracket has stops at free ends thereof. The rotation limiter includes a dual wheel assembly. The dual wheel assembly has a support bracket secured to a lower surface of the upper seat support. The support bracket has a pair of wheels rotatably disposed therein. The pair of wheels are rotatably disposed within the semi-circular bracket. A plurality of straps extend outwardly from the side supports of the seat assembly. The straps are adapted for securement to the existing automobile seat when the seat assembly is positioned on the automobile seat.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rotating automobile seat which has all the advantages of the prior art swivel seats and none of the disadvantages.

It is another object of the present invention to provide a new and improved rotating automobile seat which may be easily and efficiently manufactured and marketed.

It is a further object of the present invention to provide a new and improved rotating automobile seat which is of durable and reliable construction.

An even further object of the present invention is to provide a new and improved rotating automobile seat which is susceptible of a low cost of manufacture with regard to both material and labor, and which accordingly is then susceptible of low prices of sale to the consuming public, thereby making such a rotating automobile seat economically available to the buying public.

Even still another object of the present invention is to provide a new and improved rotating automobile seat for allowing a person to easily get into and out of a vehicle.

Lastly, it is an object of the present invention to provide a new and improved rotating automobile seat including a seat assembly. A rotation assembly is secured between upper and lower seat supports of the seat assembly. A rotation limiter is secured between the upper and lower seat supports of the seat assembly. A plurality of straps extend outwardly from the seat assembly. The straps are adapted for securement to an existing vehicle seat when the seat assembly is positioned on the vehicle seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive manner in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a sectional view of the present invention illustrating the wheel assembly.

FIG. 4 is a cross-sectional top plan view of the present invention as taken along line 4—4 of FIG. 2 illustrating the bearing assembly and the wheel assembly thereof.

The same reference numerals refer to the same parts through the various figures.

DESCRIPTION OF THE PREFERRED EMBODIMENT

Figure 1:
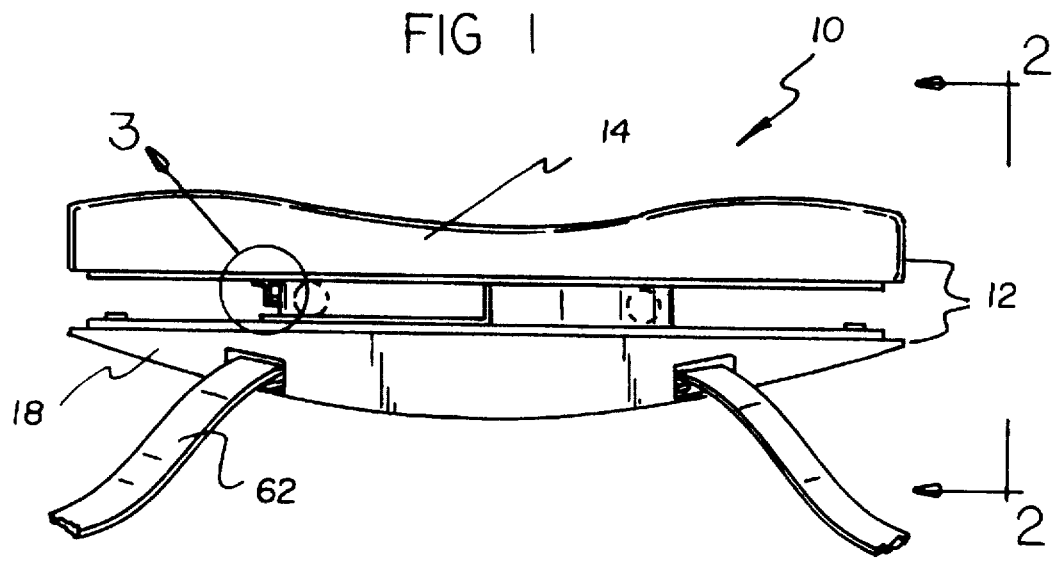
FIG. 1 is a side view of the preferred embodiment of the rotating automobile seat constructed in accordance with the principles of the present invention.
Figure 2:
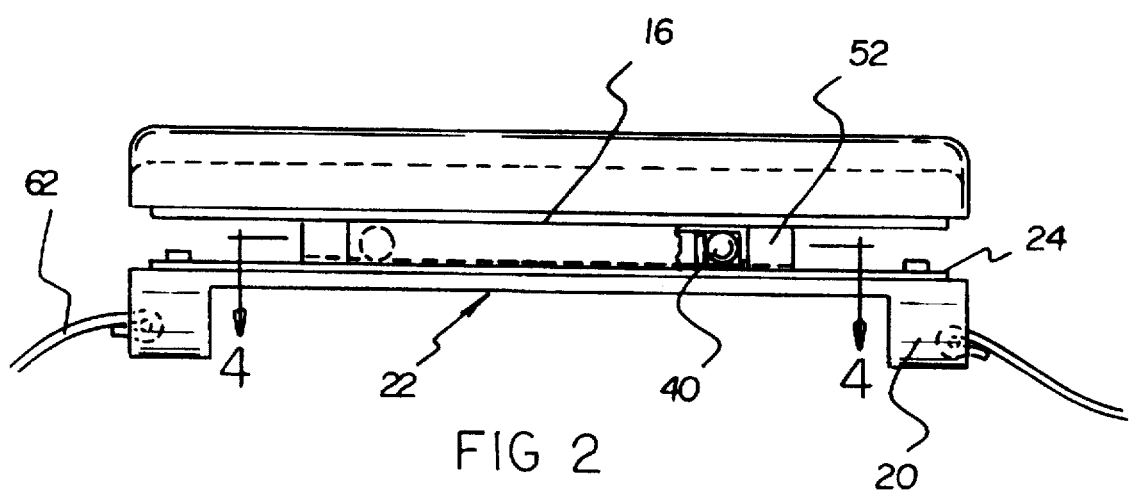
FIG. 2 is a front elevation view of the present invention as taken along line 2—2 of FIG. 1.

With reference now to the drawings, and in particular, to FIGS. 1 through 4 thereof, the preferred embodiment of the new and improved rotating automobile seat embodying the principles and concepts of the present invention and generally designated by the reference number 10 will be described.

Specifically, it will be noted in the various Figures that the device relates to a rotating automobile seat for allowing a person to easily get into and out of a vehicle. In its broadest contest, the device consists of a seat assembly, a rotation assembly, a rotation limiter and a plurality of straps. Such components are individually configures and correlated with respect to each other so as to attain the desired objective.

The device 10 includes a seat assembly 12 comprised of a padded upper seat 14. The padded upper seat is preferably contoured to allow for comfortable seating by a user. Note FIG. 1. The padded seat can be covered in vinyl, cloth or leather to match an interior of the automobile. The padded upper seat has a rigid upper seat support 16 secured to a lower surface thereof. The seat assembly includes a base member 18. The base member has a pair of side supports 20 extending downwardly therefrom. A space 22 is disposed between the pair of side supports. The space is dimensioned for receiving an existing automobile seat therein. Note FIG. 2. The base member has a rigid lower seat support 24 secured to an upper surface thereof.

A rotation assembly 28 is secured between the upper and lower seat supports of the seat assembly. The rotation assembly includes a circular channel member 30 defined by exterior 32 and interior walls 34 secured to an upper surface of the lower seat support. The exterior wall has a lower peripheral flange 36 extending outwardly therefrom. A plurality of screws 38 extend through the flange and into the lower seat support to facilitate the securement. Note FIG. 4. The circular channel member has a plurality of ball bearings 40 disposed therein.

A rotation limiter 44 is secured between the upper and lower seat supports of the seat assembly. The rotation limiter includes a semi-circular bracket 46 secured to the upper surface of the lower seat support disposed outwardly of the rotation assembly. The semi-circular bracket is defined by a lower horizontal member 48 secured to the lower seat support by a plurality of screws 49 and an upper vertical member 50 that is curved along the exterior wall of the rotation assembly. The semi-circular bracket has stops 52 at free ends thereof. Note FIG. 4. The rotation limiter includes a dual wheel assembly 54. The dual wheel assembly has a support bracket 56 secured to a lower surface of the upper seat support. The support bracket has a pair of wheels 58 rotatably disposed therein. Note FIG. 3. The pair of wheels are rotatably disposed within the semi-circular bracket. As the device rotates the pair of wheels will glide along the upper vertical member until they reach the stops positioned on opposing ends of the semi-circular bracket. The rotation limiter allows for a ninety degree rotation from left to right and stops the device from fully turning.

A plurality of straps 62 extend outwardly from the side supports of the seat assembly. Note FIGS. 1 and 2. The straps are adapted for securement to the existing automobile seat when the seat assembly is position on the automobile seat.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A rotating automobile seat for allowing a person to easily get into and out of a vehicle comprising, in combination:

a seat assembly comprised of a padded upper seat, the padded upper seat having a rigid upper seat support secured to a lower surface thereof, the seat assembly including a base member, the base member having a pair of side supports extending downwardly therefrom, a space disposed between the a pair of side supports dimensioned for receiving an existing automobile seat therein, the base member having a rigid lower seat support secured to an upper surface thereof;

a rotation assembly secured between the upper and lower seat supports of the seat assembly, the rotation assembly including a circular channel member defined by interior and exterior walls secured to an upper surface of the lower seat support, the circular channel member having a plurality of ball bearings disposed therein;

a rotation limiter secured between the upper and lower seat supports of the seat assembly, the rotation limiter including a semi-circular bracket secured to the upper surface of the lower seat support disposed outwardly of the rotation assembly, the semi-circular bracket having stops at free ends thereof, the rotation limiter including a dual wheel assembly, the dual wheel assembly having a support bracket secured to a lower surface of the upper seat support, the support bracket having a pair of wheels rotatably disposed therein, the pair of wheels rotatably disposed within the semi-circular bracket; and a plurality of straps extending outwardly from the side supports of the seat assembly, the straps adapted for securement to the existing automobile seat when the seat assembly is positioned on the automobile seat.

2. A rotating automobile seat comprising:

a seat assembly;

a rotation assembly secured between upper and lower seat supports of the seat assembly;

a rotation limiter secured between the upper and lower seat supports of the seat assembly; and a plurality of straps extending outwardly from the seat assembly, the straps adapted for securement to an existing vehicle seat when the seat assembly is positioned on the vehicle seat;

wherein the rotation limiter includes a semi-circular bracket secured to the upper surface of the lower seat support disposed outwardly of the rotation assembly, the semi-circular bracket having stops at free ends thereof, the rotation limiter including a dual wheel assembly, the dual wheel assembly having a support bracket secured to a lower surface of the upper seat support, the support bracket having a pair of wheels rotatably disposed therein, the pair of wheels rotatably disposed within the semi-circular bracket.

3. The rotating automobile seat as set forth in claim 2 wherein the seat assembly is comprised of a padded upper seat, the padded upper seat having the upper seat support secured to a lower surface thereof, the seat assembly including a base member, the base member having a pair of side supports extending downwardly therefrom, a space disposed between the pair of side supports dimensioned for receiving an existing automobile seat therein, the base member having the lower seat support secured to an upper surface thereof.

4. The rotating automobile seat as set forth in claim 2 wherein the rotation assembly includes a circular channel member defined by interior and exterior walls secured to an upper surface of the lower seat support, the circular channel member having a plurality of ball bearing disposed therein.

* * * * *